UNITED STATES PATENT OFFICE.

JULIUS EDMUND DOTCH, OF WASHINGTON, D. C., ASSIGNOR OF ONE-HALF HIS RIGHT TO OSCAR LOEW, OF NEW YORK CITY.

IMPROVEMENT IN THE MODE OF PRESERVING MEATS.

Specification forming part of Letters Patent No. 128,372, dated June 25, 1872; antedated June 12, 1872.

*To all whom it may concern:*

Be it known that I, JULIUS EDMUND DOTCH, of the city of Washington, District of Columbia, have invented a new Method of Preserving Meats, Poultry, Fish, Oysters, Eggs, and all other animal and vegetable substances; and I do hereby declare that the following is a full and exact description thereof:

The nature of the invention consists in treating the meat, &c., with very diluted iodine solutions in liquid or gaseous form, which slight amount of iodine will be removed from the surface of the meat before it is used or sold by washing the same with a very diluted solution of hyposulphite of soda.

This process may be modified in several ways. The meat may be placed for about fifteen minutes into an aqueous or diluted alcoholic solution of iodine and then packed, whereby all fungi are killed and any fungoid growth prevented, the iodine forming a loose and antiseptic combination with the surface of the meat—the fibrine—the interior remaining untouched; or, a small percentage of iodine may be dissolved in collodion, the meat dipped into it, and the volatile parts evaporated; the iodinized skin of collodion preserves very well; or, I employ a solution of a small percentage of iodine in chloroform, ethers, chloride of ethyl, or related combinations, with or without the addition of thymol.

The meat is then put into air-tight vessels and a small quantity of this solution poured into the vessel, and the vessel is then closed. Before use, the meat, &c., is washed with a very diluted solution of hyposulphite of soda, then the meat is placed in water of 100° Fahrenheit and brought under the air-pump, when the meat will have its original color and smell.

In preserving meats according to this system my mode of operation is the following: When I use an aqueous or diluted alcoholic solution of iodine for the preservation of beef, mutton, &c., I use generally about four to five per cent. of iodine; but in the collodion or chloroform solutions I seldom use more than one per cent. When I preserve poultry, fish, or game with the skin, I use stronger percentage of iodine.

What I claim as my invention, and desire to secure by Letters Patent, is—

The process of preserving meats, poultry, fish, oysters, eggs, and all other animal and vegetable substances by the use of iodine in aqueous or alcoholic solutions, or in vapors with chloroform, ethers, nitrous oxide, amylen, chloride of methyl, chloride of ethyl, or related combinations, and the perfect removal of it afterward from the meats, &c., by solutions of hyposulphite of soda, or the additional use of exhausters.

JULIUS EDMUND DOTCH.

Witnesses:
A. L. HAYES,
Z. T. WILBER.